(No Model.)
B. WILT.
COMBINED HARROW AND PULVERIZER.
No. 317,909. Patented May 12, 1885.
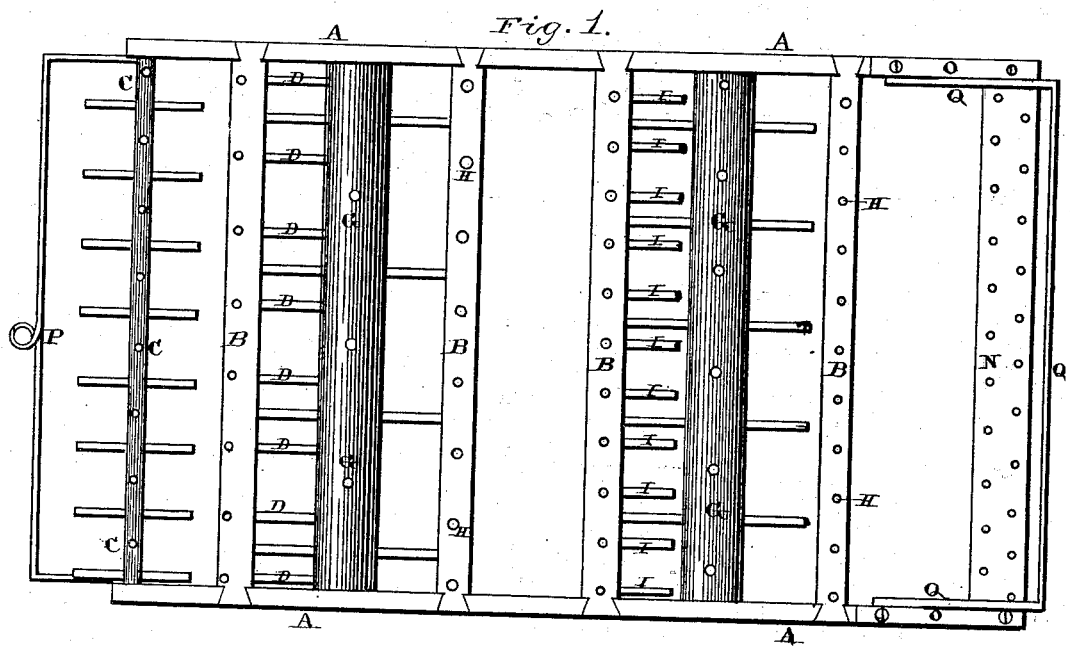
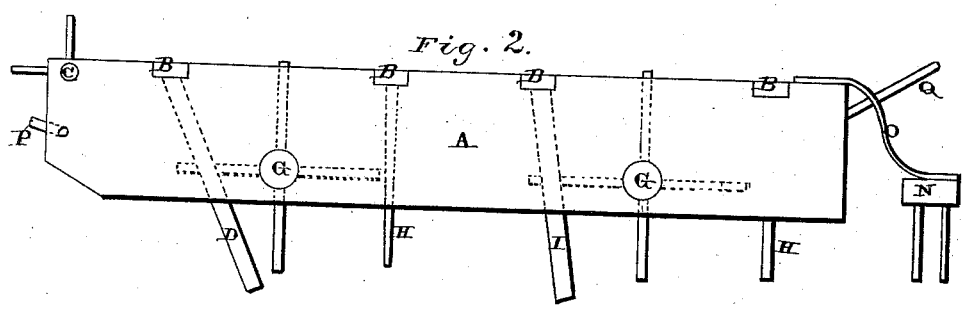
WITNESSES.
A. S. Pattison
J. E. Prosperi.
INVENTOR.
B. Wilt,
per J. A. Lehmann,
Attorney

UNITED STATES PATENT OFFICE.

BENJAMIN WILT, OF PHILADELPHIA, PENNSYLVANIA, ASSIGNOR OF ONE-HALF TO JACOB FISHER, JR., OF SAME PLACE.

COMBINED HARROW AND PULVERIZER.

SPECIFICATION forming part of Letters Patent No. 317,909, dated May 12, 1885.

Application filed December 22, 1884. (No model.)

*To all whom it may concern:*

Be it known that I, BENJAMIN WILT, of Philadelphia, Pennsylvania, have invented certain new and useful Improvements in Combined Harrows and Pulverizers; and I do hereby declare the following to be a full, clear, and exact description of the invention, such as will enable others skilled in the art to which it pertains to make and use it, reference being had to the accompanying drawings, which form part of this specification.

My invention relates to an improvement in combined harrows and pulverizers; and it consists in the combination of the elevated front roll, a series of cutters and teeth arranged in rows one behind the other, two toothed rollers which are arranged between rows of cutters and teeth, and a spring-actuated raker which is attached to the rear end of the frame, all of which will be more fully described hereinafter.

The object of my invention is to provide a machine that will harrow and pulverize the ground very thoroughly at the same time, and thus effect a saving in labor and time.

Figure 1 is a plan view of a machine embodying my invention. Fig. 2 is a side elevation of the same.

A represents the two side bars, which are connected together by the cross-bars B, to which the cutters are secured.

Journaled in between the front ends of the side bars is the toothed roller C, which is raised above the level of the other rollers a suitable distance, so that its teeth will only come in contact with the largest clods, or raised portions of ground, or piles of clods. This roller serves to catch the clods and move them toward the front rows of cutters D. In passing over smooth plowed ground the teeth of this roller may not come in contact with any of the clods; but should there be a gathering of clods in front of the cutters, then this elevated or scalp roller first acts to force the clods under the cutters until the cutters begin to choke, and then the moving clods cause the roller to reverse its movement, and thus force the clods away from the cutters, so as to free them.

Back of the front roller is the first row of cutters, D, which are inclined backward at an angle of about forty-five degrees. These cutters serve to cut the sod without tearing it up, and run deeper than the teeth, in order to leave the sod undisturbed until the next plowing, when it will be properly decomposed. Back of these cutters is the toothed roller G, which is caused to revolve as the machine is drawn along, and which serves to catch the clods and draw them back toward the teeth H at the same time that they serve to pulverize them. Should the clods begin to clog the teeth or cutters, the forward motion of the clods causes the roller to reverse its motion, and thus draw the clods away from the teeth and thus free them. The ends of the rollers may be journaled solidly in the side bars, or there may be vertical slots cut in the bars and springs placed upon the tops of the journals. By this construction the rollers can rise upward in case they strike a stone or other obstruction, and then return to place again. Back of the roller G is the first set of teeth H, which do not extend downward as far as the cutters, so as to not disturb the sod. These teeth raise what clods they do not break, so that the roller G will act upon them and break them.

Back of the teeth is a second set of cutters, I, arranged more closely together than the front set, a second revolving toothed roller, G, and another set of teeth, H, also set closely together. The action of these rear cutters, roller, and teeth is the same as the set in front, only that they pulverize the clods much finer than the front set. The weight of the harrow forces the teeth and cutters down into the earth sufficiently far to bring the teeth of the rollers into active operation.

To the rear end of the frame is secured the rake N by means of the springs O. This rake has its teeth set staggering, and serves to rake and smooth the ground as the machine is drawn along.

To the front end of the frame is secured the draft-iron P, and to the rear of the frame is secured the rod Q, by means of which the machine can be lifted over obstructions of all kinds.

Pivoted levers having rollers on their lower ends may be attached to each end of both of the side beams. When the harrow is in use, these levers will be turned up out of the way; but when the harrow is being moved to and from the field the levers are turned down, so as to bring the rollers into use and raise the harrow upward.

Having thus described my invention, I claim—

1. The combination of the two inclined sets of cutters D I, the two sets of teeth H, and the two toothed rollers G with the front roller, C, substantially as shown.

2. The combination of the elevated front roller, the two sets of cutters, the two toothed rollers G, the two sets of teeth, and the rake, substantially as set forth.

In testimony whereof I affix my signature in presence of two witnesses.

BENJAMIN WILT.

Witnesses:
JAMES SADLEIR,
WM. M. McKNIGHT.